(12) United States Patent
Sun et al.

(10) Patent No.: US 8,749,483 B2
(45) Date of Patent: Jun. 10, 2014

(54) CONTROL DEVICE AND CONTROL METHOD FOR IMAGE DISPLAY

(75) Inventors: Cheng Kuang Sun, Hsin-Chu (TW); En Feng Hsu, Hsin-Chu (TW); Chao Chien Huang, Hsin-Chu (TW); Cho Yi Lin, Hsin-Chu (TW)

(73) Assignee: Pixart Imaging Inc., Hsin-Chu County (TW)

( * ) Notice: Subject to any disclaimer, the term of this patent is extended or adjusted under 35 U.S.C. 154(b) by 749 days.

(21) Appl. No.: 12/909,058

(22) Filed: Oct. 21, 2010

(65) Prior Publication Data

US 2011/0032230 A1 Feb. 10, 2011

Related U.S. Application Data

(63) Continuation-in-part of application No. 11/675,538, filed on Feb. 15, 2007, now Pat. No. 8,345,002.

(30) Foreign Application Priority Data

Oct. 26, 2009 (TW) .............................. 98136116 A

(51) Int. Cl.
*G09G 5/00* (2006.01)

(52) U.S. Cl.
USPC ............................................. 345/156; 345/82

(58) Field of Classification Search
USPC .................................................. 345/156–173
See application file for complete search history.

(56) References Cited

U.S. PATENT DOCUMENTS

| | | |
|---|---|---|
| 4,959,721 A | 9/1990 | Micic et al. |
| 5,644,126 A * | 7/1997 | Ogawa ....................... 250/231.1 |
| 5,703,623 A | 12/1997 | Hall et al. |
| 6,765,555 B2 | 7/2004 | Wu |
| 2003/0095109 A1* | 5/2003 | Sasaki et al. .................. 345/173 |
| 2006/0244726 A1 | 11/2006 | Wang et al. |
| 2006/0284841 A1* | 12/2006 | Hong et al. ................... 345/157 |
| 2008/0180396 A1 | 7/2008 | Lin et al. |
| 2008/0204382 A1* | 8/2008 | Lim et al. ......................... 345/83 |
| 2008/0252664 A1* | 10/2008 | Huang et al. .................. 345/690 |
| 2008/0284724 A1* | 11/2008 | Alten ............................ 345/156 |

FOREIGN PATENT DOCUMENTS

| | | |
|---|---|---|
| JP | 11305935 A | 11/1999 |
| JP | 2008192146 A | 8/2008 |
| TW | 200540687 | 12/2005 |
| TW | 200742600 | 11/2007 |
| TW | 200801638 A | 1/2008 |
| TW | 200829007 | 7/2008 |
| TW | 200831169 A | 8/2008 |
| TW | 200838358 A | 9/2008 |

* cited by examiner

*Primary Examiner* — Viet Pham
(74) *Attorney, Agent, or Firm* — Lowe Hauptman & Ham, LLP

(57) ABSTRACT

A control device for an image display includes at least two reference points, a modulation unit and a remote controller. The modulation unit modulates the light of a predetermined spectrum generated by the reference points with a brightness variation cycle. The modulation unit controls the reference points to emit the light with a first brightness within a first period of the brightness variation cycle and to emit the light with a second brightness within a second period of the brightness variation cycle, wherein the first brightness and the second brightness are not zero gray level. The remote controller captures the light of the predetermined spectrum with a sampling cycle and demodulates an image variation of the reference points with respect to the remote controller. The present invention further provides a control method for an image display.

20 Claims, 13 Drawing Sheets

CONTROL DEVICE AND CONTROL METHOD FOR IMAGE DISPLAY

CROSS REFERENCE TO RELATED APPLICATION

This application is a Continuation-in-Part of U.S. application Ser. No. 11/675,538, filed Feb. 15, 2007 and claims the priority benefit of Taiwan Patent Application Serial Number 098136116 filed Oct. 26, 2009, the full disclosures of each of which is incorporated herein by reference.

BACKGROUND OF THE INVENTION

1. Field of the Invention

The present invention relates to an interactive system, and more particularly, to a control device and a control method for an image display.

2. Description of the Related Art

A conventional cursor control method, such as the Taiwan patent publication no. 200540687, entitled "apparatus for cursor control and method thereof", discloses a method for cursor control using a hand-held device. First, an optical device of the hand-held device is used to detect a movement. Afterward, a position difference is calculated according to the detected movement. Then, the hand-held device transmits the position difference to a specific device wirelessly to accordingly control cursor activity thereon, and operate an application on the specific device according to the cursor activity. However, when the optical device is used to sense an image area, a distance between the optical device and the object to be captured, and a rotation degree of the optical device during capturing images all influence the image position on the sensing array. If the calibration is not made simultaneously, the cursor will be likely to be inexactly controlled. Furthermore, because the image captured by the optical device contains all objects falling within the field of view thereof, the image recognition process is more complicated.

In order to solve the above problem, the copending Taiwan patent application no. 095116011, entitled "POINTER POSITIONING DEVICE AND METHOD" and Taiwan patent application no. 095149408, entitled "CURSOR CONTROLLING METHOD AND APPARATUS USING THE SAME" are provided. These inventions are to arrange at least one reference point to generate an infrared spectrum signal with a wavelength of about 940 nm and to arrange an infrared pass filter on an image sensor to remove the light out of the infrared spectrum thereby simplifying the image recognition process. Further, these inventions are to control an image display according to the change of the images of reference point, such as displacement, captured by the image sensor. The image sensor is immune to the influence of the light generated by the fluorescent lamp (wavelength 350-750 nm) commonly used for indoor illumination. However, the image sensor is prone to the influence of the light generated by the halogen lamp (wavelength 350-1100 nm). Therefore, when a halogen lamp is placed close to the reference point, images captured by the image sensor equipped with the infrared pass filter will contain both the reference point and halogen lamp. This will cause a rear-end image processor to make an inexact recognition and therefore fails to exactly control the image display. Moreover, the control device is also prone to the influence of sunlight.

In view of the above, there is a further need to improve the conventional control devices for image display in order to increase the control precision of the control devices.

SUMMARY OF THE INVENTION

The present disclosure provides a control device and a control method for an image display. The present disclosure is to modulate the light of a predetermined spectrum generated by at least one reference point and then to detect the modulated light of the predetermined spectrum through a remote controller thereby accordingly controlling the image display. Because the remote controller can eliminate the interference of ambient light, the accuracy of the control of the image display can be increased.

In one embodiment, the control device of an image display of the present disclosure includes at least two reference points, a modulation unit and a remote controller. The modulation unit modulates the light of the predetermined spectrum generated by the reference points with a brightness variation cycle. The modulation unit controls the reference points to emit the light with a first brightness within a first period of the brightness variation cycle and to emit the light with a second brightness within a second period of the brightness variation cycle, wherein the first brightness and the second brightness are not zero gray level. The remote controller captures the light of the predetermined spectrum with a sampling cycle and demodulates an image variation of the reference points with respect to the remote controller.

In another embodiment, the control device of an image display of the present disclosure includes a first reference point, a second reference point, a modulation unit and a remote controller. The modulation unit modulates the light generated by the first reference point with a first cycle and the light generated by the second reference point with a second cycle. The modulation unit controls the first reference point to emit the light with a first brightness within a first period of the first cycle and to emit the light with a second brightness within a second period of the first cycle. The modulation unit controls the second reference point to emit the light with a third brightness within a third period of the second cycle and to emit the light with a fourth brightness within a fourth period of the second cycle, wherein the first brightness, the second brightness, the third brightness and the fourth brightness are not zero gray level. The remote controller captures the light of the predetermined spectrum with a sampling cycle and demodulates an image variation of the first and second reference points with respect to the remote controller.

In a further embodiment, the control method for an image display of the present disclosure includes the steps of: providing a first reference point and a second reference point each to generate the light of a predetermined spectrum; modulating the light generated by the first reference point with a first cycle so that the first reference point emits the light with a first brightness within a first period of the first cycle and emits the light with a second brightness within a second period of the first cycle; modulating the light generated by the second reference point with a second cycle so that the second reference point emits the light with a third brightness within a third period of the second cycle and emits the light with a fourth brightness within a fourth period of the second cycle; and providing a remote controller to capture the light of the predetermined spectrum with a sampling cycle and demodulate an image variation of the first and second reference points with respect to the remote controller; wherein the first brightness, the second brightness, the third brightness and the fourth brightness are not zero gray level.

According to the present disclosure, the control device and control method for image display can be adapted to control a variety of image displays, for example, computer display, display of a video game, projection display, monitor and television. In one embodiment, the control device and control method may control the movement of a cursor controlled by the control interface of an image display so as to set or adjust function states of the image display. In another embodiment, the rotation of the remote controller of the control device may simulate the rotation action of an analog knob to relatively control function states of the image display. In addition, the television may be a CRT display, liquid crystal display, plasma display or the like.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
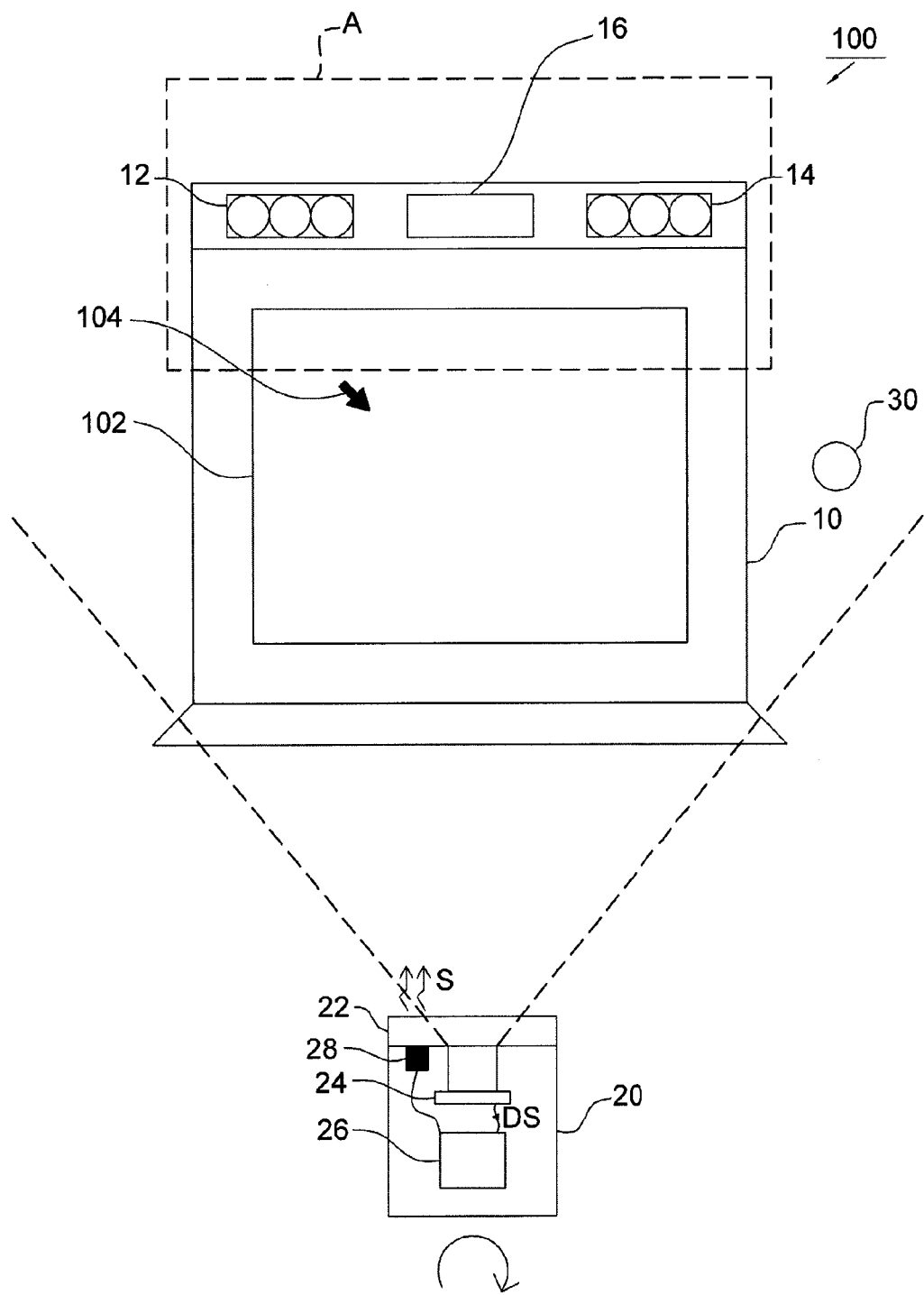
FIG. 1 is a schematic view of the control device of an image display according to the first embodiment of the present invention.

The foregoing, as well as additional objects, features and advantages of the invention will be more readily apparent from the following detailed description, which proceeds with reference to the accompanying drawings. In this invention, identical reference numerals will be used when designating substantially identical elements that are common to the figures.

Referring to FIG. 1, it illustrates the control device 100 of an image display 10 according to the first embodiment of the present invention. The control device 100 includes an image display 10 having a display screen 102 configured to show images, two reference points 12, 14, a modulation unit 16 and a remote controller 20. The image display 10 may be a television, a display of a video game, a projection display, a computer display, a monitor or any other devices that can show images. The function states of the image display 10, for example, volume adjustment, channel selection, color setting and sound setting, can be set and adjusted through a user interface. The above setting and adjustment may be performed by controlling a cursor 104 on the display screen 102 through a control panel (not shown in the figure) or a remote controller.

The reference points 12, 14 can generate the light of a predetermined spectrum. The reference points 12, 14 may be formed by arranging a plurality of infrared light-emitting diodes (IR LEDs), for example, the LEDs with a wavelength of about 940 nm. The various arrangements of the IR LEDs can constitute the reference points 12, 14 of different shapes. For example, in this embodiment, the reference points 12, 14 are formed by arranging three IR LEDs in a line. That is, the reference points 12, 14 are two arrays of IR LEDs. In other embodiment, the reference points 12, 14 can be ones that have different areas, or that are an array or a point. The modulation unit 16 is coupled to the reference points 12, 14 and modulates the light of the predetermined spectrum generated by the reference points 12, 14 in a predetermined manner. For example, the modulation unit 16 periodically modulates the light with a predetermined modulation frequency. In one embodiment, the predetermined modulation frequency is 20 Hz and the light of the predetermined spectrum generated by the reference points 12, 14 are simultaneously modulated with the modulation frequency of 20 Hz. In other embodiments, the light of the predetermined spectrum generated by the reference points 12, 14 may be modulated with different predetermined modulation frequencies. It will be noted that when the light of the predetermined spectrum generated by the reference points 12, 14 are modulated with different predetermined modulation frequencies, one predetermined modulation frequency preferably is an integer multiple of the other predetermined modulation frequency so that the modulated light of the predetermined spectrum generated by the reference points 12, 14 can be synchronized. For example, when the light of the predetermined spectrum generated by the reference point 12 is modulated with a frequency of 20 Hz and the light of the predetermined spectrum generated by the reference point 14 is modulated with a frequency of 40 Hz, it is meant that the reference point 14 is lit up once every 25 milliseconds (ms) and the reference point 12 is lit up once every 50 ms. Specifically, when the reference point 12 is lit up once, the reference point 14 has been lit up twice. Preferably, the reference point 14 will be lit up simultaneously when the reference point 12 is lit up so as to synchronize the lighting. In addition, the light of the predetermined spectrum generated by the reference points 12, 14 can be modulated with reverse predetermined modulation frequencies described above, respectively. In other embodiments, the light of the predetermined spectrum generated by the reference points 12, 14 can be non-periodically modulated so that the light generated by the reference points 12, 14 can distinguish from the ambient light. This is very critical when the spectrum of the ambient light partially or fully overlaps with the predetermined spectrum. Furthermore, the reference points 12, 14 and the modulation unit 16 can combine with the image display 10. Alternatively, these elements can be independent elements and are placed near the image display 10 when operation.

The remote controller 20 includes an optical filter 22, an image sensor 24, a processing unit 26 and a wireless communication unit 28. The remote controller 20 receives the light of the predetermined spectrum generated by the reference points 12, 14 through the image sensor 24 to form a digital image. The image display 10 will then be relatively controlled according to the changes of the images of the reference points 12, 14, for example, the changes of position or angle in the digital image. The explanation will be described in the following paragraphs. For example, when the image display 10 is a television, the remote controller 20 will be a TV remote controller 20 and can control the television. When the image display 10 is a display of a video game, the remote controller 20 can perform the game control. When the image display 10 is a projection display, the remote controller 20 can be a mouse to control operations of the application software shown on the projection display. It will be appreciated that the above displays and the control methods are only exemplary and not limited to the present invention. In other embodiments, different controls can be executed on other types of display. The wireless communication unit 28 is under the control of the processing unit 26 and will transmit a control signal S to the image display 10 so as to relatively control operations of the image display 10.

Figure 2A:
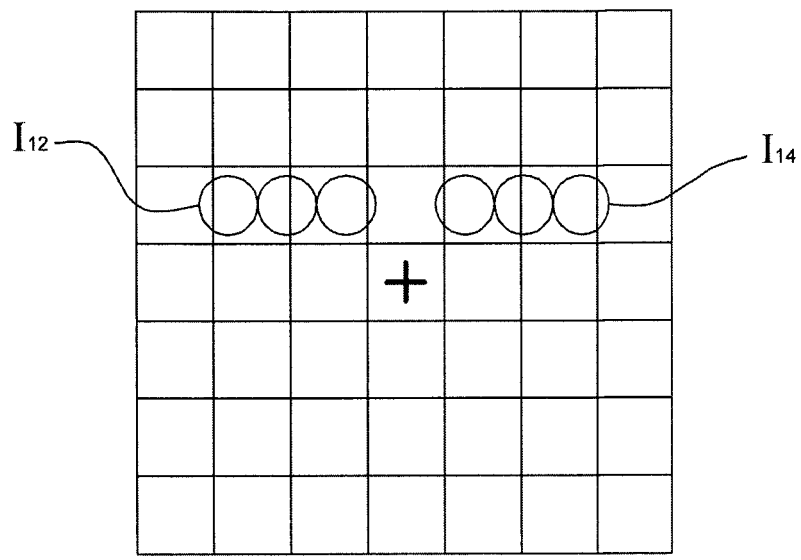
FIG. 2a is a schematic view of the image captured by the image sensor of the present invention, wherein the control device has a modulation unit to modulate the light of the predetermined spectrum thereby eliminating the interference of ambient light.
Figure 2B:
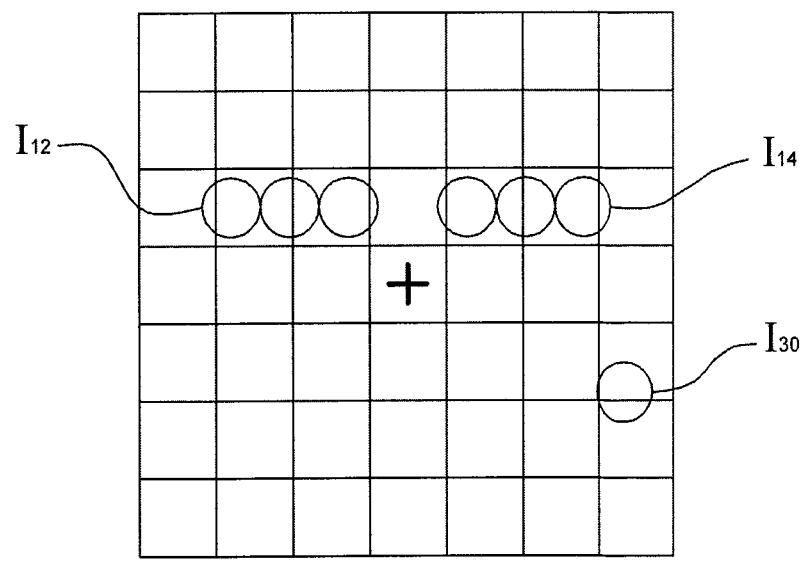
FIG. 2b is a schematic view of the image captured by the image sensor of the present invention, wherein the captured image contains an image of the ambient light source because the light of the predetermined spectrum is not modulated by the modulation unit.

Referring to FIGS. 1, 2a and 2b, when the first embodiment of the present invention is executed, for the purpose of illustration, it is assumed that a light source 30, such as a halogen lamp or the sun light source is positioned near the image display 10 and within the field of view of the image sensor 24. The spectrum of the light generated by the light source 30 partially or fully overlaps with the predetermined spectrum of the light generated by the reference points 12, 14. First, the reference points 12, 14 are periodically modulated by the modulation unit 16 to generate the light of the predetermined spectrum with the predetermined modulation frequency. In order to have the image sensor 24 capable of capturing the image of the predetermined spectrum, the predetermined modulation frequency is preferably smaller than the sampling frequency of the image sensor 24 that is defined as the number of frames sampled by the image sensor 24 per second. The sampling frequency of the image sensor 24 is preferably an integer multiple of the predetermined modulation frequency so that the sampling of the image and the lighting of the reference points 12, 14 are performed simultaneously. For example, in one embodiment, the sampling frequency of the image sensor 24 is 200 Hz, i.e. sampling once every 5 ms, and the predetermined modulation frequency of the reference points 12, 14 is 20 Hz, i.e. lit once every 50 ms. When the image sensor 24 samples at the $10^{th}$ time, the reference points 12, 14 are all lit up so that the image sensor 24 can successfully capture the light of the predetermined spectrum generated by the reference points 12, 14.

Afterward, the image sensor 24 will receive the light of the predetermined spectrum generated by the reference points 12, 14 through the optical filter 22. Because the optical filter 22 is capable of removing the light out of the predetermined spectrum, the image sensor 24 can capture only images of the reference points 12, 14 and light source 30 and then generates a digital signal DS. The processing unit 26 receives the digital signal DS and then relatively controls the image display 10 according to the changes of the images of the reference points 12, 14. Because the processing unit 26 controls the image display 10 according to the changes of the images of the reference points 12, 14, a miscontrol will occur if information of the light source 30 is contained during calculating. Therefore, the processing unit 26 is required to be capable of demodulating the above modulated signal modulated with the predetermined modulation frequency in the digital signal DS and then generates a digital image that includes only the images of the reference points 12, 14, as shown in FIG. 2a, wherein $I_{12}$ and $I_{14}$ are the images of the reference points 12 and 14, respectively. Finally, the processing unit 26 calculates the changes of the images of the reference points 12, 14 and then controls the wireless communication unit 28 to transmit a control signal S to the image display 10 to relatively control the image display 10. In this manner, the interference of ambient light can be eliminated and the control can be executed more exactly. In contrast, if the control system does not have the mechanism of modulation and demodulation, the digital image will contain the images of the reference points 12, 14 and the light source 30, i.e. images $I_{12}$, $I_{14}$ and $I_{30}$ shown in FIG. 2b.

Figure 3:
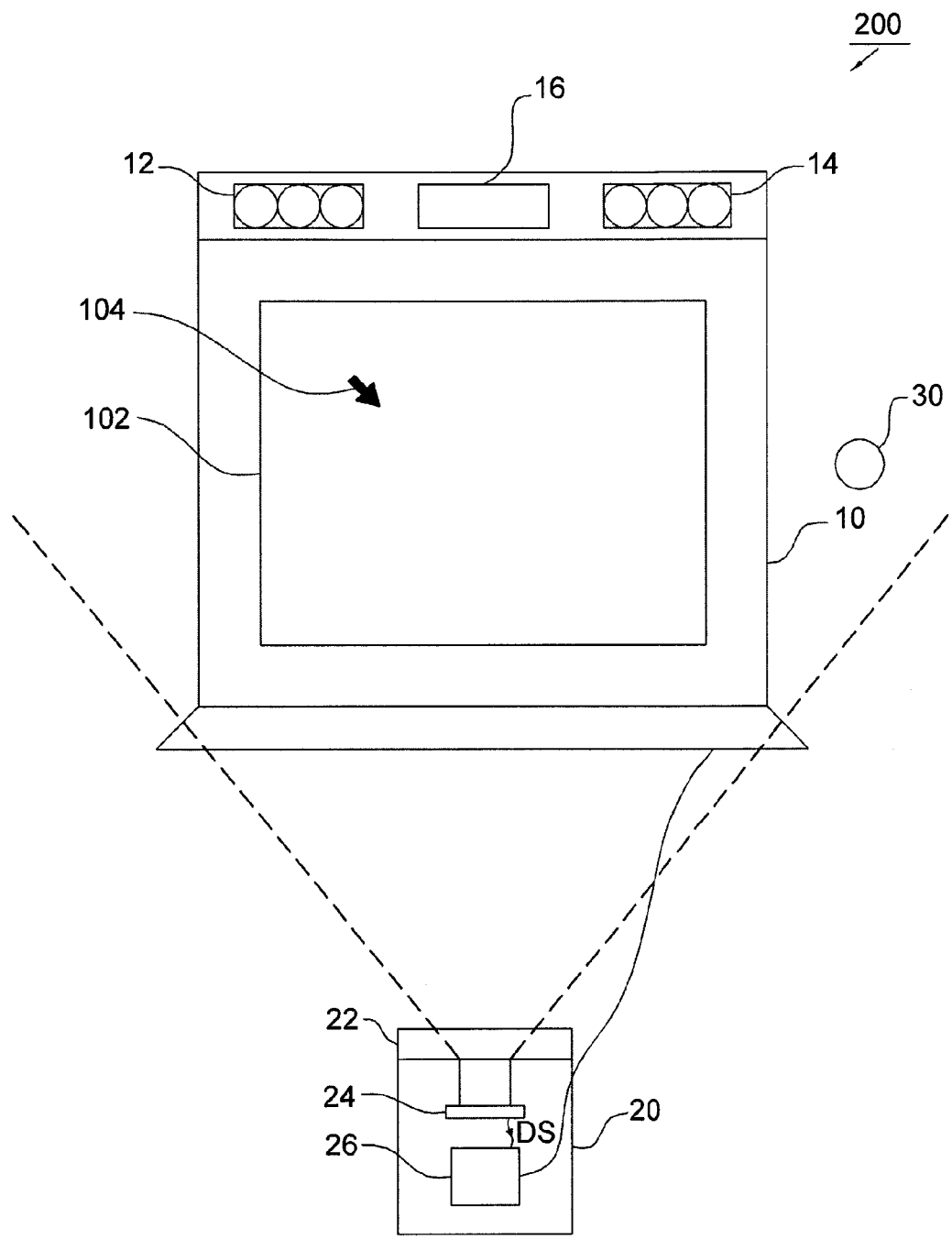
FIG. 3 is a schematic view of the control device of an image display according to the second embodiment of the present invention.
Figure 4:
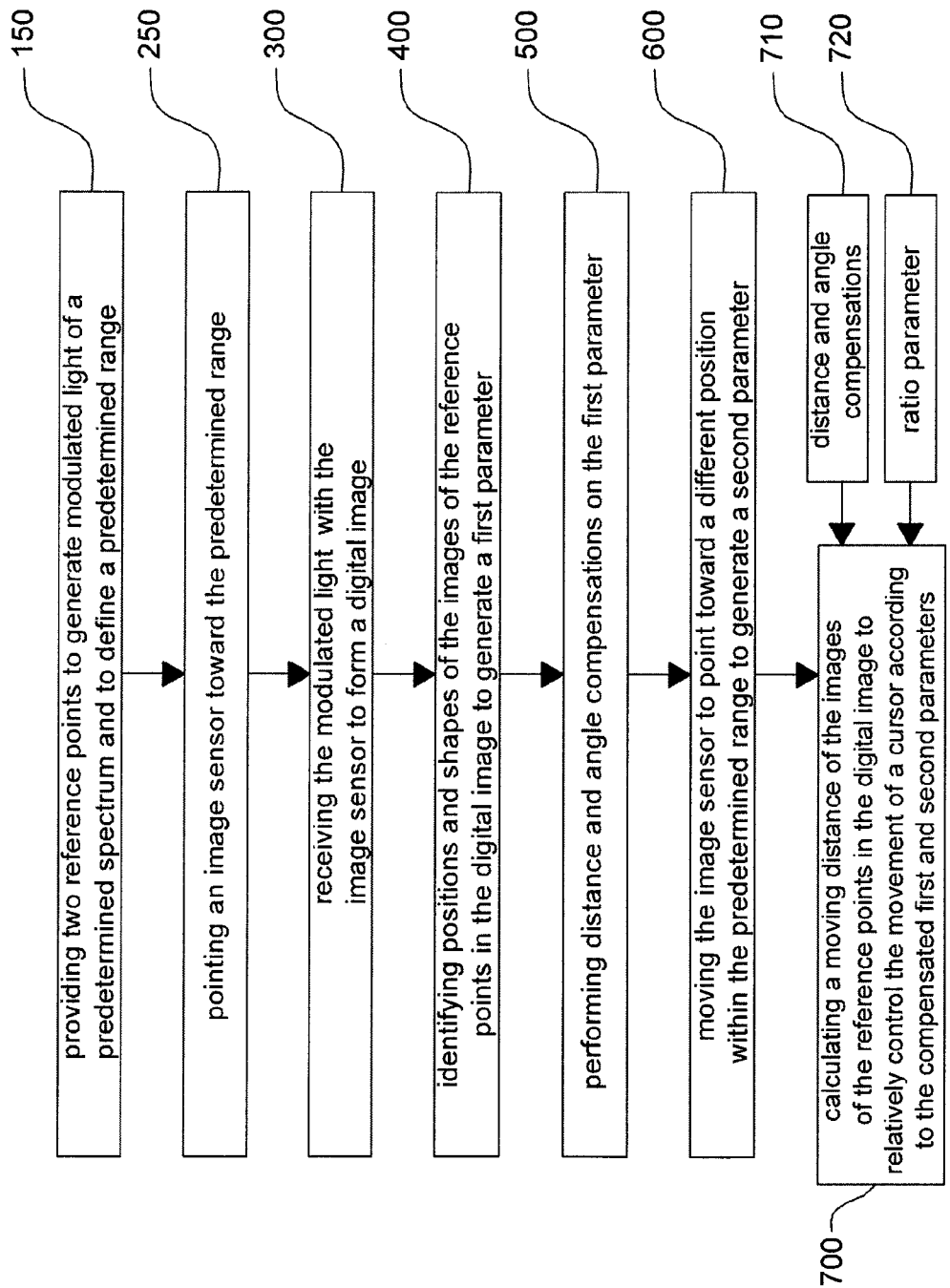
FIG. 4 is a flow chart illustrating that the control device of the image display is configured to control the movement of a cursor on the image display according to the embodiments of the present invention.

Referring to FIG. 3, it illustrates the control device 200 of the image display according to the second embodiment of the present invention. The remote controller 20 is electrically connected to the image display 10 so as to relatively control the adjustment and setting of the image display 10. For example, in a video game system, the remote controller is electrically connected to the display screen so as to relatively control the game. Similarly, the control device 200 of the image display includes the image display 10, the reference points 12, 14, modulation unit 16 and remote controller 20. The remote controller 20 receives the light signal of the predetermined spectrum generated by the reference points 12, 14 through the image sensor 24 to form a digital image DS. The processing unit 26 generates a digital image according to the digital signal DS and then relatively controls the image display 10 according to the changes of the images of the reference points 12, 14 in the digital image. The modulation unit 16 modulates the light of the predetermined spectrum generated by the reference points 12, 14 and the processing unit 26 demodulates the digital image formed by the digital signal DS so as to eliminate the influence of the ambient light. It is to be noted that although two reference points 12 and 14 are illustrated in the embodiments of the present invention, the present invention is not limited to this. In other embodiments, a single reference point can be served as reference of image recognition. Alternatively, only one of the two reference points is modulated. Two embodiments of that the control devices 100, 200 relatively control the image display 10 according to the changes of the images of the reference points 12, 14 in the digital image, e.g. the changes of position or angle will be described in the following paragraphs.

Referring to FIGS. 4-7, in one embodiment, the control device 100 or 200 may be configured to control the movement of a cursor 104 on the display screen 102 of the image display 10 and the reference points 12, 14 have the same shape but different areas. For example, the reference point 12 is shown in the figures with a large star sign and the corresponding image of the reference point 12 in the digital image is shown as $I_{12}$. The reference point 12 is shown in the figures with a small star sign and the corresponding image of the reference point 14 in the digital image is shown as $I_{14}$. The cursor control method includes the steps of: providing two reference points to generate modulated light of a predetermined spectrum and to define a predetermined range (step 150); pointing an image sensor toward the predetermined range (step 250); receiving the modulated light with the image sensor to form a digital image (step 300); identifying positions and shapes of the images of the reference points in the digital image to generate a first parameter (step 400); performing distance and angle compensations on the first parameter (step 500); moving the image sensor to point toward a different position within the predetermined range to generate a second parameter (step 600); and calculating a moving distance of the images of the reference points in the digital image to relatively control the movement of a cursor according to the compensated first and second parameters (step 700). In step 700, the distance and angle in connection with the second parameter will be compensated simultaneously (step 710) and a ratio parameter can be optionally inputted (step 720) to control the sensitivity of the movement of the cursor. The step 720 may not be required to be performed according to the different application.

Figure 5A:
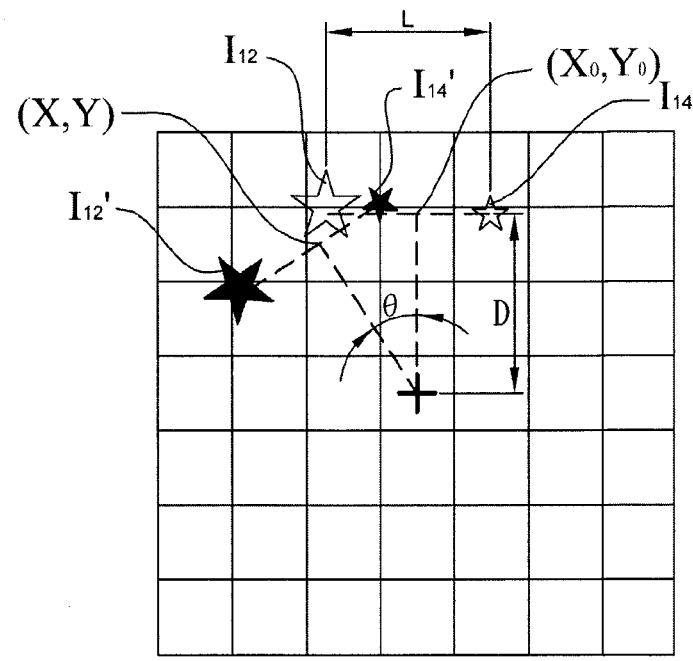
FIG. 5a is a schematic view of the digital image captured by the image sensor of the remote control when the remote controller is clockwise rotated at a certain degree angle according to the embodiments of the present invention.

Referring to FIGS. 1, 4 and 5a again, the processing unit 26 of the control device 100 or 200 preferably pre-stores a predetermined image position parameter and a predetermined image distance parameter before shipment. The predetermined parameters can be ones that are obtained according to the images $I_{12}$ and $I_{14}$ of the reference points 12 and 14 captured by the image sensor 24 at a predetermined distance, said three meters between the remote controller 20 and the reference points 12, 14, as shown in FIG. 5a. These predetermined parameters can be served as the reference of distance and angle compensations. According to the plane coordinate formed by the sensing array of the image sensor 24, for example, the plane coordinate with the center "+" of the sensing array as the origin, the predetermined image position parameter and the predetermined image distance parameter can be defined. For example, the predetermined image position parameter can contain the information about the coordinates of the predetermined images $I_{12}$ and $I_{14}$ of the reference points 12 and 14, the average coordinate $(X_0, Y_0)$ of the predetermined images $I_{12}$ and $I_{14}$, and the inclined angle of the line connecting the predetermined images $I_{12}$ and $I_{14}$. The predetermined image distance parameter can contain the information about the distance L between the predetermined images $I_{12}$ and $I_{14}$, and the distance D between the original point "+" and the average coordinate $(X_0, Y_0)$.

First, the reference points 12, 14 generate a light of a predetermined spectrum, for example, an infrared spectrum herein. In this way a sensible area "A" enclosing the reference points 12, 14 can be determined according to the field of view of the image sensor 24 and the illumination angle of the reference points 12, 14 (step 150). Afterward, the image sensor 24 of the remote controller 20 is pointed toward a position anywhere in the sensible area "A" (step 250). Because the image sensor 24 of the present invention can sense only the light of the predetermined spectrum and the light of the predetermined spectrum generated by the reference points 12, 14 is modulated by the modulation unit 16, the processing unit 26 can generate a digital image that contains only the images of the reference points 12, 14 (step 300), as $I_{12}'$ and $I_{14}'$ shown in FIG. 5a. Furthermore, in this embodiment, it is assumed that the remote controller 20 rotates clockwise at an angle of θ while capturing the digital image. In this way the images $I_{12}'$ and $I_{14}'$ of the reference points 12, 14 will rotate at the angle of θ with respect to the predetermined images $I_{12}$ and $I_{14}$ of the reference points 12, 14 captured at the predetermined distance by the image sensor 24. This will cause the average coordinate $(X, Y)$ of the images $I_{12}'$ and $I_{14}'$ to be different from the average coordinate $(X_0, Y_0)$ of the predetermined images $I_{12}$ and $I_{14}$ even if the image sensor 24 points toward the same position inside the sensible area "A".

Referring to FIGS. 1, 4, 5a and 5b, the processing unit 26 identifies positions and shapes of the images $I_{12}'$ and $I_{14}'$ and generates a first parameter that comprises a first image position parameter, a first image distance parameter and a first image shape parameter (step 400). The processing unit 26 then performs a compensation for the angle according to the deflection of angle θ between the first image position parameter (for example, the average coordinate of the images $I_{12}'$ and $I_{14}'$ and the inclined angle of the line between the image $I_{12}'$ and $I_{14}'$) and the predetermined image position parameter (for example, the images $I_{12}$ and $I_{14}$ of the predetermined reference points, and the inclined angle of the line between the image $I_{12}$ and $I_{14}$). The compensation can be performed according to the following equation (1):

$$\begin{bmatrix} X' \\ Y' \end{bmatrix} = \begin{bmatrix} \cos(\theta) & -\sin(\theta) \\ \sin(\theta) & \cos(\theta) \end{bmatrix} \begin{bmatrix} X \\ Y \end{bmatrix} \quad (1)$$

where θ denotes the deflection of rotation angle between the first image position parameter and the predetermined image position parameter, X, Y denotes the average coordinate of the uncompensated first image position parameter, and X', Y' denotes the average coordinate of the compensated image position parameter for the reference points. Therefore, the images of the compensated reference points are the images that are obtained base on the same reference. In this manner when a user uses the control device to capture images at the same distance to the image display 10, the results will be the same no matter the degree of rotation of the image sensor 24.

Figure 5B:
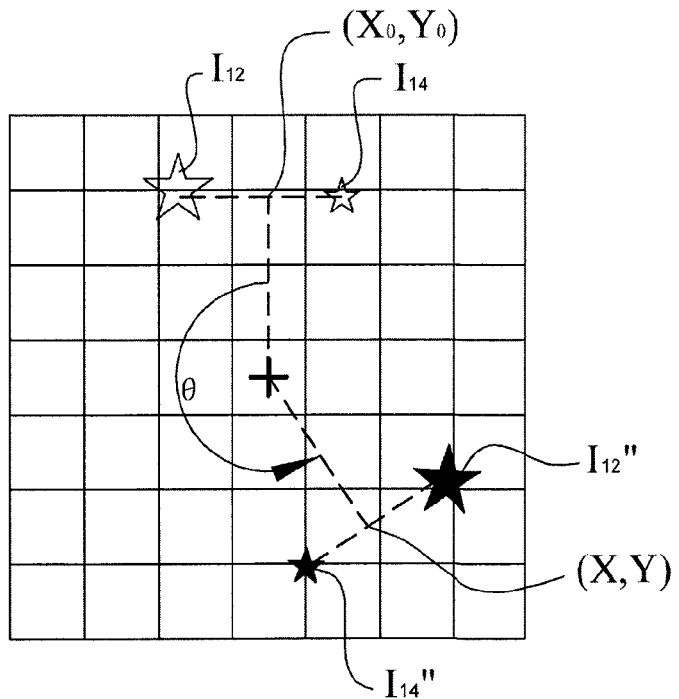
FIG. 5b is a schematic view of the digital image captured by the image sensor of the remote control when the remote controller is clockwise rotated over 180 degrees according to the embodiments of the present invention.

However, when the deflection of rotation angle θ is greater than 180 degrees and therefore the images $I_{12}''$ and $I_{14}''$ of the reference points are formed, as shown in FIG. 5b. When there is no difference between the images $I_{12}$, $I_{14}$ (i.e. both with the same size and shape), it fails to identify that the images $I_{12}''$ and $I_{14}''$ are formed resulting from the rotation or translation of the image $I_{12}'$ and $I_{14}'$ (shown in FIG. 5a). Therefore, in this embodiment, the two reference points 12, 14 have different areas. The respective positions of the images of the reference points 12, 14 are identified according to the image shape parameter (for example, the areas of the images of the reference points) obtained by the processing unit 26 and the angle compensation is then performed. In this way the angle compensation can still be exactly performed even if the image sensor 24 rotates for over 180 degrees.

Figure 6:
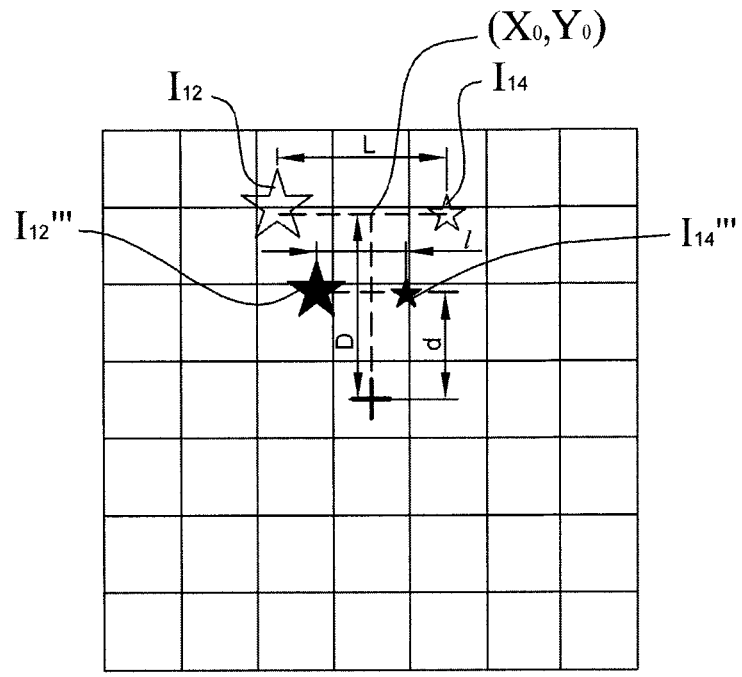
FIG. 6 is a schematic view of the digital image captured by the image sensor of the remote control when the remote controller is moved away at different distances according to the embodiments of the present invention.

Referring FIG. 6, it illustrates a method of distance compensation according to the embodiments of the present invention. The image sensor 24 of the remote controller 20 is used to capture the predetermined images $I_{12}$ and $I_{14}$ of the reference points 12 and 14 at the predetermined distance. When the distance between the remote controller 20 and the reference points 12, 14 gradually increases, the images of the reference points 12, 14 captured by the image sensor 24 will become smaller and the average coordinate of the images will be closer to the center "+" of the sensing array accordingly, as the $I_{12}'''$ and $I_{14}'''$ shown in the figure. However, the above deviations do not reflect that a user is changing the pointing position of the remote controller 20. Therefore, the change of the distance from the remote controller 20 to the reference points 12, 14 will be misidentified as a horizontal movement of the remote controller 20 if a calibration is not performed. In the embodiments of the present invention, it is assumed that the distance between the images $I_{12}$ and $I_{14}$ is represented by L, and the distance between the average coordinate $(X_0, Y_0)$ of the images $I_{12}$, $I_{14}$ and the center "+" of the sensing array is represented by D in the predetermined image distance parameter. The distance between the images $I_{12}'''$ and $I_{14}'''$ is represented by l, and the distance between the average coordinate of the images $I_{12}'''$, $I_{14}'''$ and the center "+" of the sensing array is represented by d in the first image distance parameter. Therefore, the deviation due to the change of the distance from the remote controller 20 to the reference points 12, 14 can be compensated according to the following equation (2) (step 500):

$$\frac{D}{L} = \frac{d}{l} \qquad (2)$$

Figure 7:
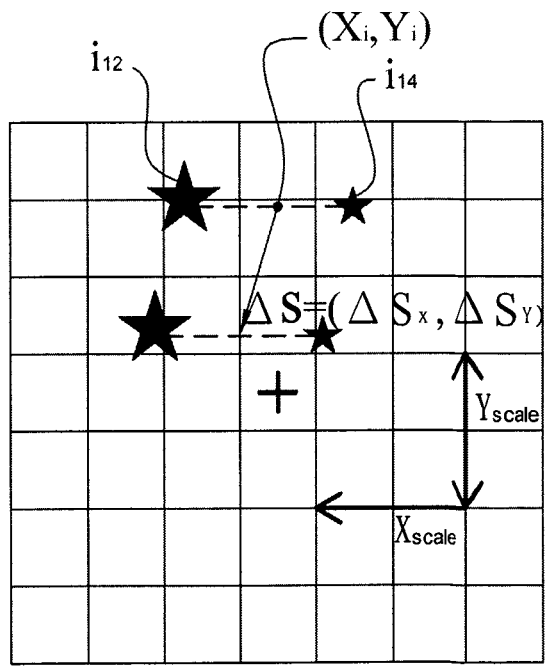
FIG. 7 is a schematic view of the digital image captured by the image sensor of the remote control when the remote controller is pointed toward different positions according to the embodiments of the present invention.

Referring to FIG. 7, it is assumed that the image positions of the reference points 12, 14 are represent by $i_{12}$ and $i_{14}$ respectively after being compensated. These images are compensated in a manner as if they are obtained at a same predetermined distance and angle. The average coordinate of the images $i_{12}$ and $i_{14}$ is represented by $(Xi, Yi)$. Afterward, the remote controller 20 is moved to point toward a different position within the sensible area "A" (step 600). In the meantime the image sensor 24 will continue to transmit the sensed digital signal DS to the processing unit 26. The processing unit 26 generates a second parameter according to the digital signal DS that comprises a second image position parameter and a second image distance parameter of the reference points 12, 14 in the digital image after the image sensor 24 has been moved to point toward a different position. The second image position parameter denotes the average coordinate of the images of the reference points 12, 14 on the plane coordinate formed by the sensing array of the image sensor 24, for example, the plane coordinate with the center "+" of the sensing array as the origin. The second image distance parameter denotes the distance between the images of the reference points 12, 14 on the plane coordinate formed by the sensing array of the image sensor 24. The processing unit 26 continues to calculate the moving distance $\Delta S$ of the images $i_{12}$ and $i_{14}$ according to the compensated first image position parameter and the compensated second image position parameter. When calculating the moving distance $\Delta S$, it is required to continue to compensate for the deviation of angle and distance in the second parameter according to the above compensation method so as to exactly control the cursor (step 710). Because the compensation method for the second parameter is identical to that for the first parameter, the description will be omitted herein. Afterward, the processing unit 26 wiredly or wirelessly transmits the results to the image display 10. The image display 10 preferably includes a built-in software application to control the user interface and cursor. When receiving the control signal S from the processing unit 26, the image display 10 will relatively control the movement of the cursor 104 on the display screen 102 (step 700). Furthermore, when calculating the moving distance $\Delta S$ of the images $i_{12}$ and $i_{14}$, a set of ratio parameters $X_{scale}$, $Y_{scale}$ can be optionally inputted to adjust the sensitivity of the movement of the cursor 104 (step 720). For example, the moving distance $\Delta S$ can be expressed according to the following equation (3):

$$\Delta S = \left( \frac{\Delta S_X}{X_{scale}}, \frac{\Delta S_Y}{Y_{scale}} \right) \qquad (3)$$

where $\Delta S_x$ denotes the component of the displacement moving in the horizontal direction and $\Delta S_y$ denotes the component of the displacement moving in the vertical direction. According to equation (3), when the $X_{scale}$ and $Y_{scale}$ become larger, the sensitivity of the movement of the cursor 104 will be reduced. In other words, it is therefore required to increase the pointing displacement of the remote controller 20 in order to make the cursor 104 move the same distance. In contrast, when the $X_{scale}$ and $Y_{scale}$ become smaller, the sensitivity of the movement of the cursor 104 will be increased. In other words, a small pointing displacement of the remote controller 20 can cause the cursor 104 to move the same distance. With the above design, the application of the control device 100 according to the present invention can be promoted.

Figure 8:
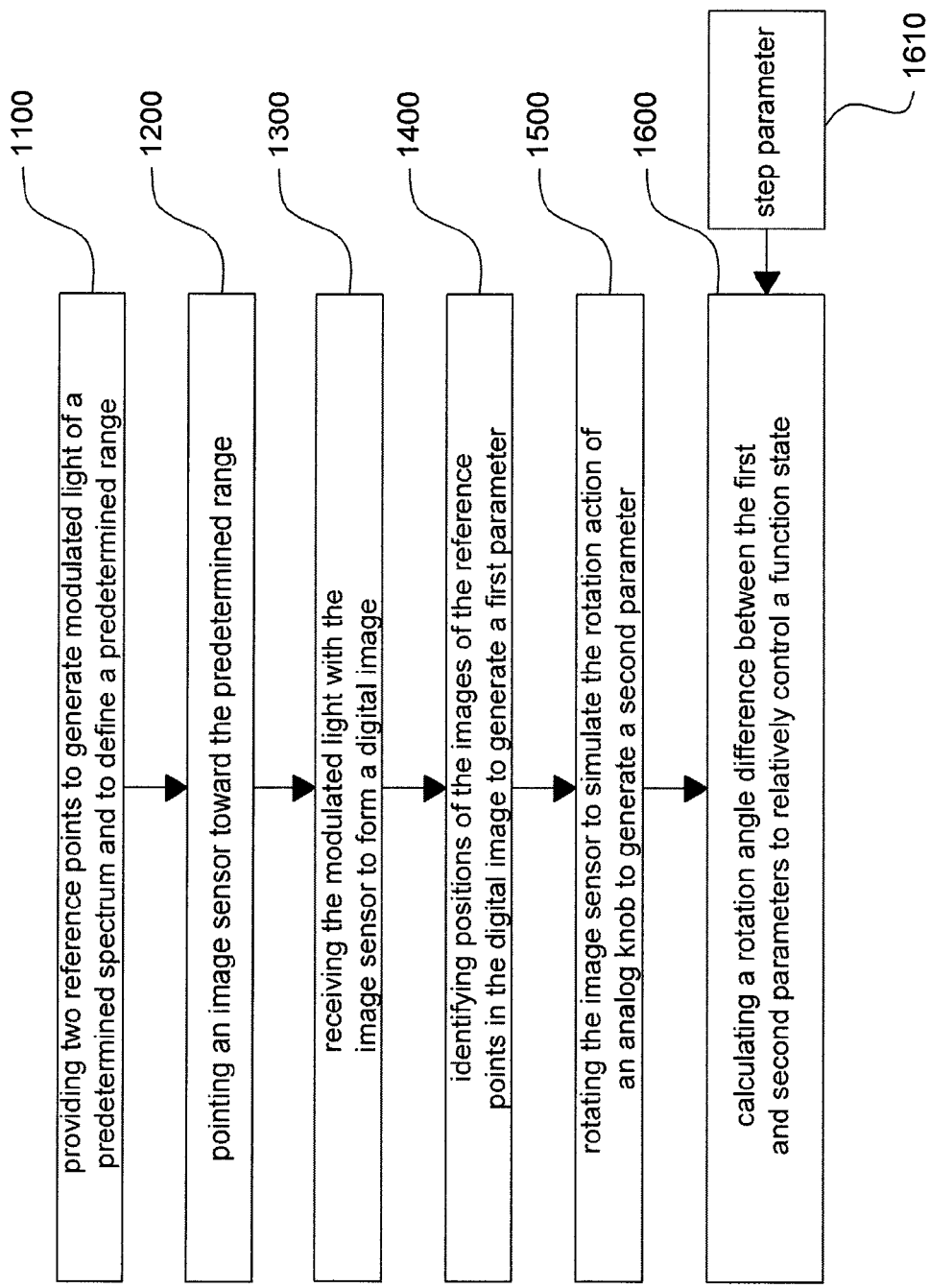
FIG. 8 is a flow chart illustrating that the control device of the image display is configured to control function states of the image display according to the embodiments of the present invention.

Referring to FIGS. 8 to 10e, in another embodiment, the control device 100 can simulate the rotation action of an analog knob so as to control function states of the image display 10. Referring to FIG. 8, the control method includes the steps of: providing two reference points to generate modulated light of a predetermined spectrum and to define a predetermined range (step 1100); pointing an image sensor toward the predetermined range (step 1200); receiving the modulated light with the image sensor to form a digital image (step 1300); identifying positions of the images of the reference points in the digital image to generate a first parameter (step 1400); rotating the image sensor to simulate the rotation action of an analog knob to generate a second parameter (step 1500); and calculating a rotation angle difference between the first and second parameters to relatively control a function state (step 1600).

Figure 9A:
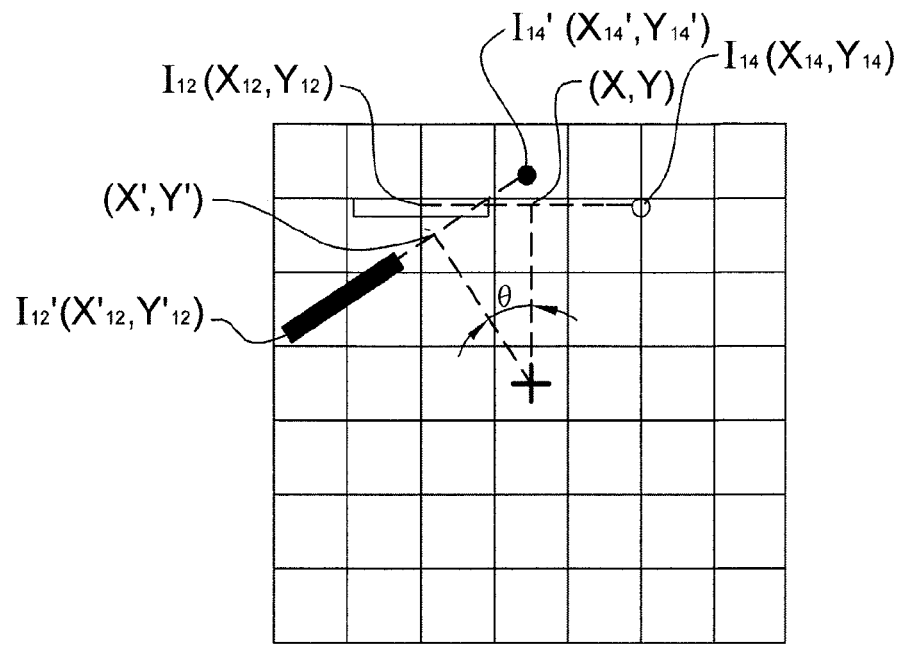
FIG. 9a is a schematic view of illustrating one approach to the calculation of the degree of rotation of the remote controller according to the embodiments of the present invention.

Referring to FIGS. 1, 8 and 9a again, the reference points 12, 14 are controlled to generate the light of a predetermined wavelength, for example, an infrared light spectrum with the wavelength of 0.84 µm to 0.94 µm and a sensible area "A" enclosing the reference points 12, 14 can be determined according to the illumination angle of the reference points 12, 14 and the field of view of the image sensor 24 (step 1100). Afterward, the image sensor 24 is pointed toward the sensible area "A" (step 1200). Because the light of the predetermined spectrum generated by the reference points 12, 14 is modulated by the modulation unit 16, the images captured by the sensing array of the image sensor 24 comprises only the images $I_{12}$ and $I_{14}$ of the reference points 12, 14 (step 1300), as shown in FIG. 9a. These images are stored in the processing unit 26. After the processing unit 26 obtains the image positions of the reference points 12, 14, a first parameter is generated and stored in the processing unit 26 (step 1400). The first parameter includes the information of the coordinates and average coordinate of the images $I_{12}$ and $I_{14}$ of the reference points 12, 14 on the plane coordinate formed by the sensing array of the image sensor 24, for example, the plane coordinate with the center "+" of the sensing array as the origin. For example, as shown in FIG. 9a, the coordinates of the images $I_{12}$ and $I_{14}$ of the reference points 12, 14 on the plane coordinate are represented by $(X_{12}, Y_{12})$ and $(X_{14}, Y_{14})$ respectively and the average coordinate of the images $I_{12}$ and $I_{14}$ is represented by $(X, Y)$.

Afterward, a user can rotate the remote controller 20 to simulate the rotation of an analog knob. In this embodiment, because the image sensor 24 is attached to the remote controller 20, the image sensor 24 will be rotated accordingly. For example, in this embodiment, the user clockwise rotates the remote controller 20, and the images of the reference points 12, 14 captured on the sensing array of the image sensor will counterclockwise rotate a certain degree (see FIG. 9a). After the images $I_{12}$, $I_{14}$ are rotated, the images $I_{12}'$, $I_{14}'$ will be formed accordingly (step 1500) and their coordinates and average coordinate are represented by $(X_{12}', Y_{12}')$, $(X_{14}', Y_{14}')$ and $(X', Y')$ respectively. The information of these coordinates will also be stored in the processing unit 26. In this embodiment, there are two approaches to the calculation of the degree of rotation of the remote controller 20, i.e. that of the image sensor 24. One of the approaches is to calculate an angle between the line connecting the average coordinate $(X, Y)$ and the center "+" of the sensing array of the image sensor 24 before rotation and the line connecting the average coordinate $(X', Y')$ and the center "+" of the sensing array of the image sensor 24 after rotation, as shown in FIG. 9a. The angle between the two lines is represented by v.

Figure 9B:
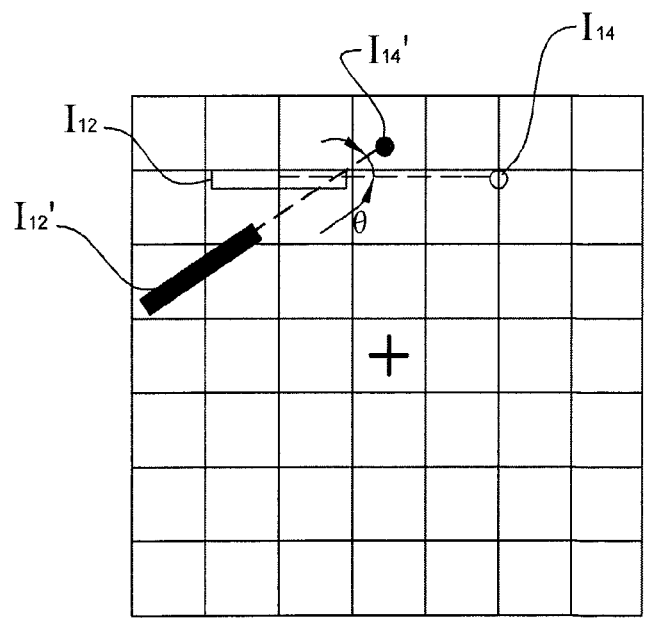
FIG. 9b is a schematic view of illustrating another approach to the calculation of the degree of rotation of the remote controller according to the embodiments of the present invention.

Referring to FIG. 9b, it illustrates the other approach to the calculation of the degree of rotation of the remote controller 20 according to the embodiment of the present invention, wherein the $I_{12}$, $I_{14}$ denote the images of the reference points 12, 14 captured on the sensing array before the remote controller 20 is rotated, and the $I_{12}'$, $I_{14}'$ denote the images of the reference points 12, 14 captured on the sensing array after the remote controller 20 is rotated clockwise. The approach is to calculate an angle θ between the line connecting the images $I_{12}$, $I_{14}$ and the line connecting the images $I_{12}'$, $I_{14}'$. The processing unit 26 then relatively controls the adjustment and setting of the function states of the image display 10.

Referring to FIG. 8 again, in order to adjust the sensitivity of the change of the function states, a step parameter can be optionally inputted into the processing unit 26 (step 1610). For example, in this embodiment, the step parameter is two degrees. Specifically, the method of simulating the rotation action of an analog knob according to the present invention can identify the rotation of at least two degrees. Because the range of the degree of rotation the processing unit 26 can identify is 358 degrees along the clockwise and counterclockwise directions respectively, 179 steps can be therefore obtained. In other embodiments, the least degree of rotation the processing unit 26 can identify can be modified by changing the step parameter. The step parameter can be set in a manner that when it is larger, the sensitivity of the change of the function states is lower. In other words, it is therefore required to rotate the remote controller 20 more in order to have the function states changed. Alternatively, the step parameter can be set in the manner that when it is smaller, the sensitivity of the change of the function states is lower. The step parameters can be set according to the applications of the products.

Figure 10A:
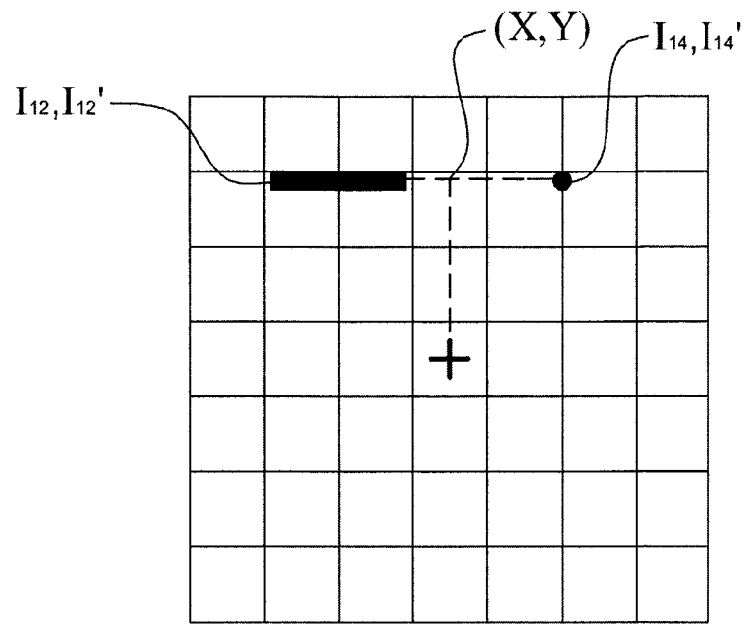
FIG. 10a is a schematic view of the digital image captured by the image sensor of the remote control according to the embodiments of the present invention, wherein the remote controller is not rotated.
Figure 10B:
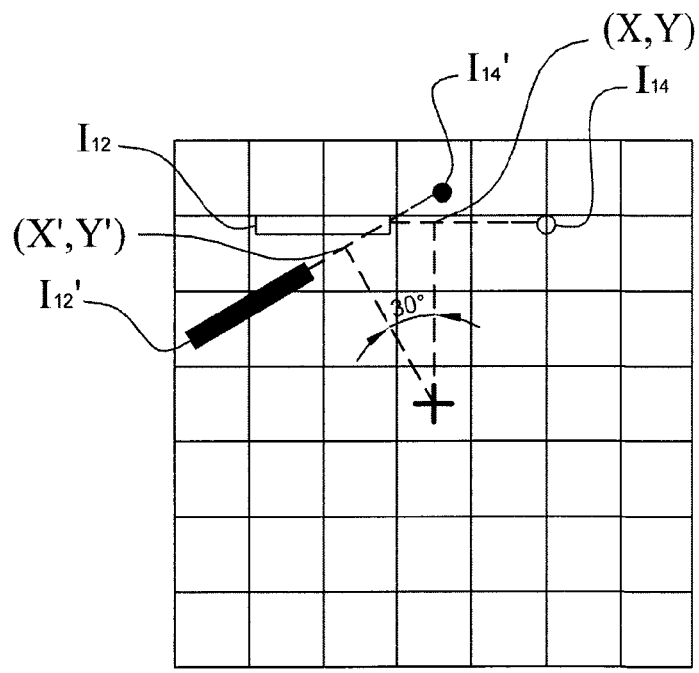
FIG. 10b is a schematic view of the digital image captured by the image sensor of the remote control according to the embodiments of the present invention, wherein the remote controller is clockwise rotated at a 30 degree angle.
Figure 10C:
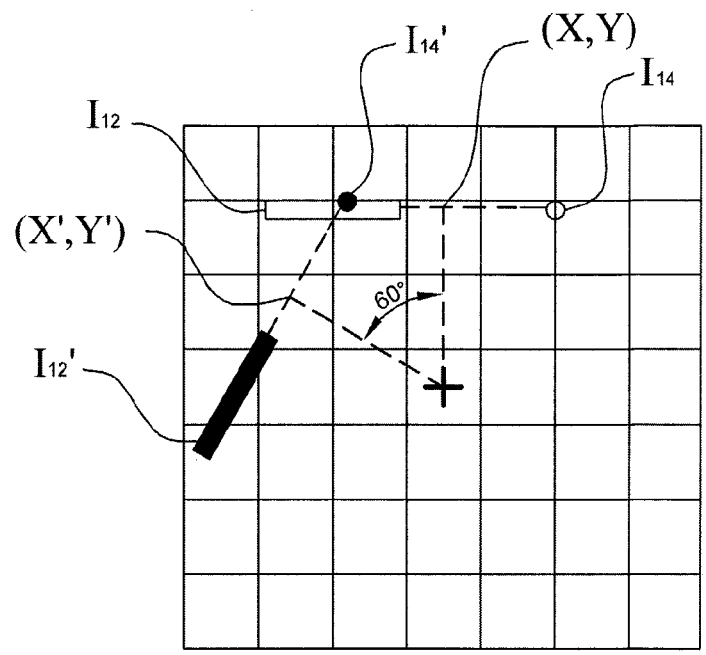
FIG. 10c is a schematic view of the digital image captured by the image sensor of the remote control according to the embodiments of the present invention, wherein the remote controller is clockwise rotated at a 60 degree angle.
Figure 10D:
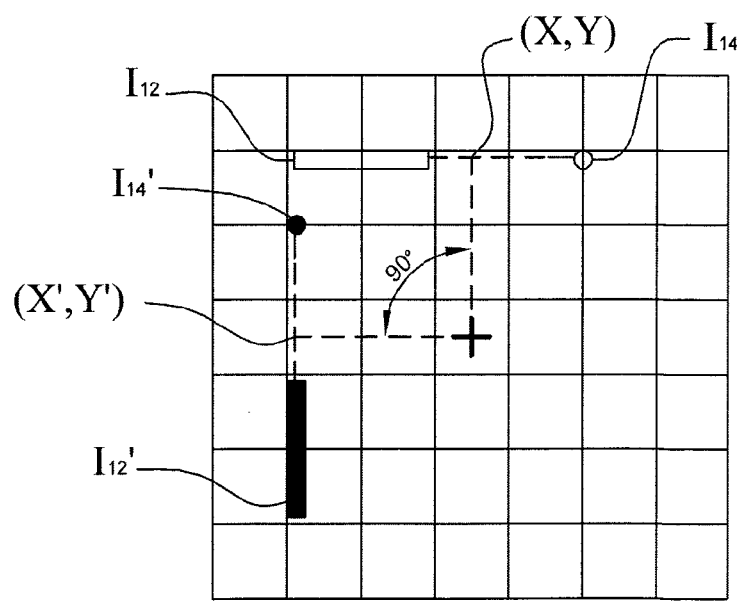
FIG. 10d is a schematic view of the digital image captured by the image sensor of the remote control according to the embodiments of the present invention, wherein the remote controller is clockwise rotated at a 90 degree angle.
Figure 10E:
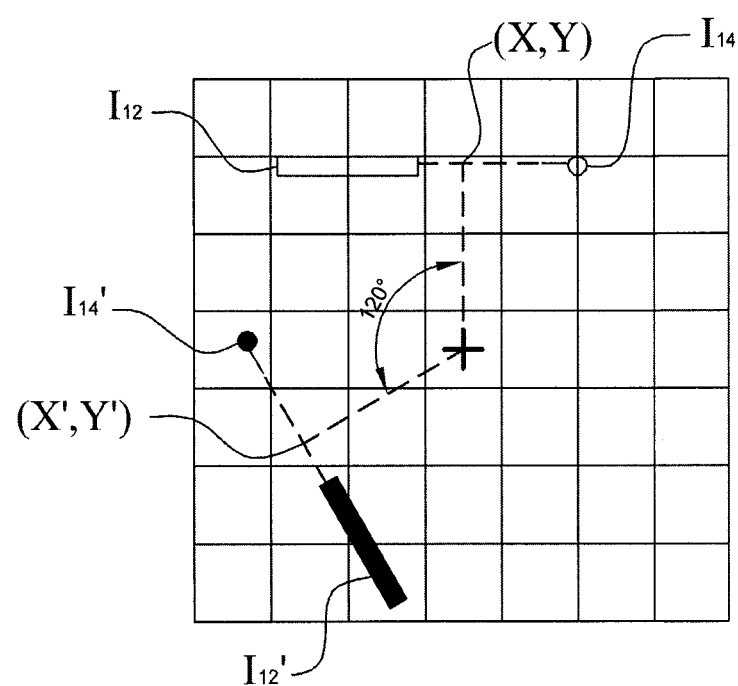
FIG. 10e is a schematic view of the digital image captured by the image sensor of the remote control according to the embodiments of the present invention, wherein the remote controller is clockwise rotated at a 120 degree angle.

Referring to FIGS. 10a to 10e, they illustrate the resulting digital images when the remote controller 20 is clockwise rotated at different angles according to the method of simulating the rotation action of an analog knob in this embodiment. Referring to FIG. 10a, it illustrates the image of the reference points when a user does not rotate the remote controller 20. This image can be chosen as a predetermined image. The images $I_{12}'$, $I_{14}'$ of the reference points in FIG. 10a are the same as the images $I_{12}$, $I_{14}$ illustrated in the step 1400, respectively. The function state can be set as unchanging under this state of the remote controller 20. Referring to FIG. 10b, it illustrates the resulting digital images when the remote controller 20 is clockwise rotated at a 30 degree angle and the angle difference between the images $I_{12}'$, $I_{14}'$ and the images $I_{12}$, $I_{14}$ is shown according to the above-mentioned first approach. The function state can be set to increase or decrease 20% under this state of the remote controller 20. Referring to FIG. 10c, it illustrates the resulting digital images when the remote controller 20 is clockwise rotated at a 60 degree angle. The function state can be set to increase or decrease 40% under this state of the remote controller 20. Referring to FIG. 10d, it illustrates the resulting digital images when the remote controller 20 is clockwise rotated at a 90 degree angle. The function state can be set to increase or decrease 60% under this state of the remote controller 20. Referring to FIG. 10e, it illustrates the resulting digital images when the remote controller 20 is clockwise rotated at a 120 degree angle. The function state can be set to increase or decrease 80% under this state of the remote controller 20. It will be appreciated that the above value settings of the function states are only exemplary and not limited to the present invention. In other embodiments, the value settings can be chosen according to the applications of the products. Furthermore, although the above remote controller 20 is rotated clockwise for illustration, it will be appreciated that the remote controller 20 can also be rotated counterclockwise to achieve the objects of the present invention. Because the embodiments of counterclockwise rotating the remote controller 20 are similar to the embodiments of clockwise rotating the remote controller 20, the detailed illustration will be omitted herein. Furthermore, although the changes of the positions and angles of the images of the reference points 12, 14 are discussed for explaining the embodiments of the present invention, it will be appreciated that the above embodiments are not limited to the present invention. In other embodiments, the uses of other changes of the images of the reference points 12, 14 to relatively control the image display 12 are still within the scope and spirit of the invention as claimed.

Figure 11A:
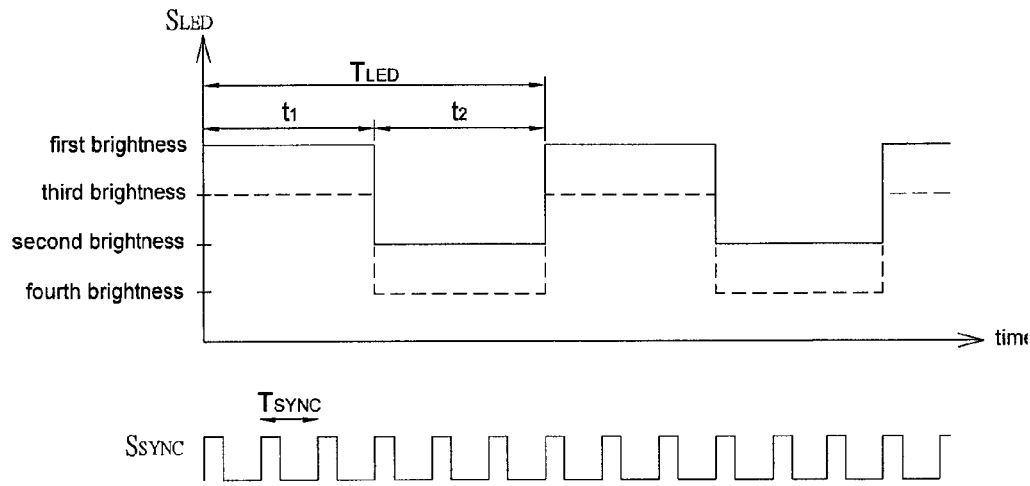
FIG. 11a is a schematic view of the relation between the light signal of the reference points and the sampling signal of the image sensor according to the embodiments of the present invention.

In another embodiment of the present invention, in order to prevent the reduction of the reporting rate of the control device 100 or 200, the modulation unit 16 can control the reference points 12, 14 to emit light with different brightness at different time intervals. Referring to FIG. 11a, it illustrates a schematic diagram to show the relation between the light signal $S_{LED}$ of the reference points 12, 14 and the sampling signal $S_{SYNC}$ of the image sensor 24, wherein the brightness variation cycle $T_{LED}$ of the reference points 12, 14 is, for example, 30 milliseconds (ms) and the sampling cycle $T_{SYNC}$ of the image sensor 24 is, for example, 5 ms, but not limited to this. The processing unit 16 can eliminate the interferences of ambient light according to the difference between the brightness variation frequency of the images of the reference points and the frequency of the ambient light in the captured images.

In this embodiment, the modulation unit 16 controls the reference points 12, 14 to emit light with a first brightness within a first period $t_1$ of the brightness variation cycle $T_{LED}$ and to emit light with a second brightness within a second period $t_2$, wherein the first brightness and the second brightness are not zero gray level and different from each other. In one embodiment, the first period $t_1$ and the second period $t_2$ are, for example a half of the brightness variation cycle $T_{LED}$, but not limited to this. In other embodiments, the first period $t_1$ and the second period $t_2$ can be different ratio of the brightness variation cycle $T_{LED}$.

In one embodiment, the first brightness and the second brightness are fully bright (for example, 255 gray level) or half bright (for example, 128 gray level). For example, the second brightness is half or twice the first brightness. It will be noted that the reference points 12, 14 can emit light with different brightness within the first period $t_1$ and the second period $t_2$. Specifically, the reference point 14 emits light with the second brightness when the reference point 12 emits light with the first brightness. The reference point 14 can also emit light with the first brightness when the reference point 12 emits light with the second brightness. In this embodiment, the reference points 12, 14 can have different areas.

In another embodiment, in addition to the arrangement of different areas to identify the reference points, modulating the reference points of the same area with different brightness can be used to identify the reference points. For example, the modulation unit 16 controls the reference point 12 to emit light with a first brightness within the first period $t_1$ of the brightness variation cycle $T_{LED}$ and to emit light with a second brightness within the second period $t_2$. The modulation unit 16 controls the reference point 14 to emit light with a third brightness within the first period $t_1$ of the brightness variation cycle $T_{LED}$ and to emit light with a fourth brightness within the second period $t_2$, wherein the first, second, third, fourth brightness are not zero gray level and different from each other. In one embodiment, the second brightness is half or twice the first brightness and the fourth brightness is half or twice the third brightness. In this manner the processing unit 16 can identify the different reference points according to the difference of the brightness when identifying the image angle of the remote controller 20. With such design the reference points 12, 14 can have identical or different areas.

Figure 11B:
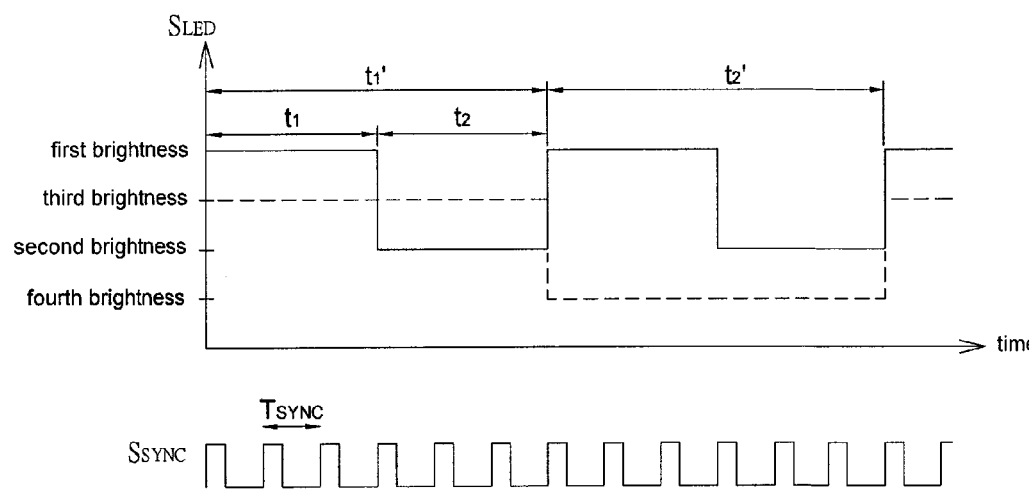
FIG. 11b is another schematic view of the relation between the light signal of the reference points and the sampling signal of the image sensor according to the embodiments of the present invention.

Referring to FIG. 11b, the modulation unit 16 can respectively modulate the reference points 12, 14 with different brightness variation cycles. For example, the modulation unit 16 modulates the reference point 12 (14) with a first brightness variation cycle and modulates the reference point 14 (12) with a second brightness variation cycle, wherein the modulation unit 16 controls the reference point 12 or 14 to emit light with a first brightness within a first period $t_1$ of the first brightness variation cycle and to emit light with a second brightness within a second period $t_2$. The modulation unit 16 controls the reference point 14 or 12 to emit light with a third brightness within a third period $t_1'$ of the second brightness variation cycle and to emit light with a fourth brightness within a fourth period $t_2'$. In this embodiment, the first brightness variation cycle and second brightness variation cycle preferably are an integer multiple of each other. The sampling cycle $T_{SYNC}$ is preferably synchronized with the first and second brightness variation cycles and the first and second brightness variation cycles are an integer multiple of the sampling cycle $T_{SYNC}$.

Figure 12A:
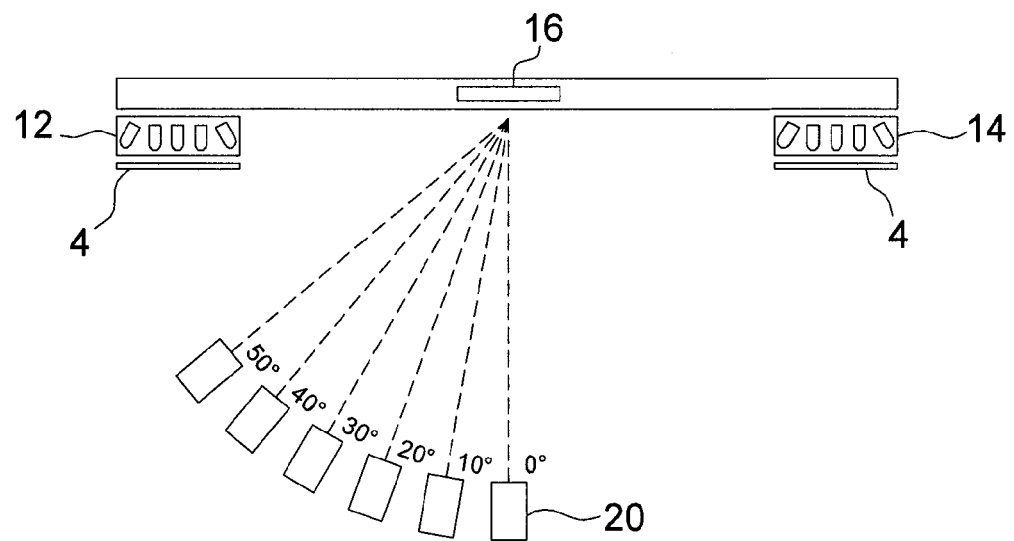
FIGS. 12a and 12b are schematic views illustrating that the remote controller of the present invention captures images at different angles, wherein two diffusers are positioned in front of the reference points, respectively.
Figure 12B:
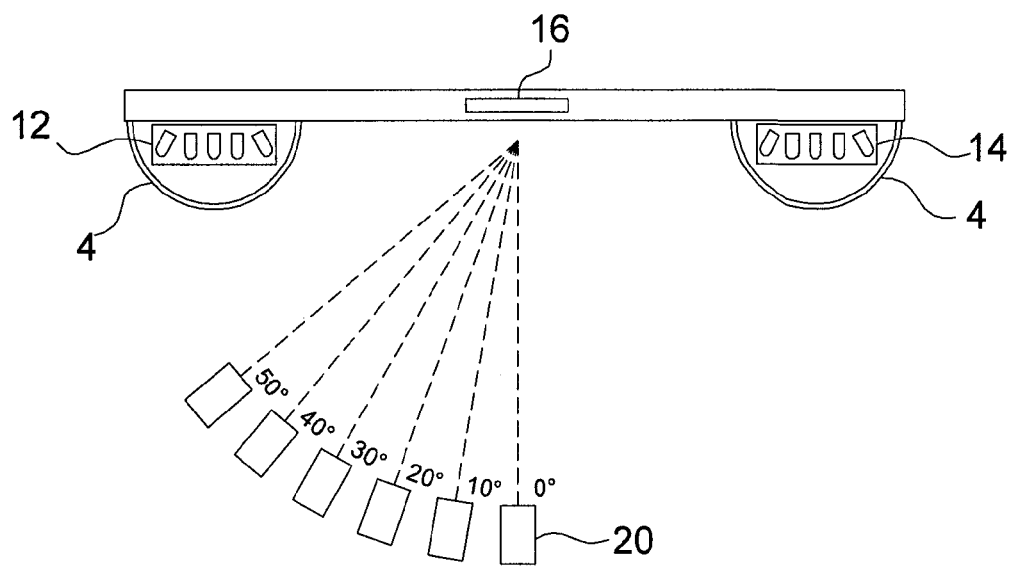

Referring to FIG. 12a, in another embodiment of the present invention, in order to have the images of the reference points 12, 14 substantially equally bright captured by the remote controller 20 at different angles, two diffusers 4 can be positioned in front of the reference points 12 and 14 respectively thereby obviating the misidentification of brightness. It will be appreciated that the diffusers 4 can have any shapes and not limited to the shape illustrated in FIG. 12a. For example, the diffusers 4 can be bended and positioned in front of the reference points 12, 14, as shown in FIG. 12b.

In view of the above, because conventional control devices of an image sensor are prone to the influence of ambient light, a miscontrol of the image display is more likely to occur. According to the control device of the image display of the present invention (as shown in FIGS. 1 and 3), the influence of ambient light can be eliminated by modulating the light of the predetermined spectrum generated by the reference points. In this way the processing unit processes the images containing only the reference points. Accordingly, the image processing can be simplified and the accuracy of the control can be increased.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A control device of an image display, comprising:
    at least two reference points configured to generate light of a predetermined spectrum;
    a modulation unit configured to modulate the light of the predetermined spectrum generated by the reference points with a brightness variation cycle and respectively with different brightness values associated with different reference points; and
    a remote controller configured to capture the light of the predetermined spectrum with a sampling cycle which is shorter than the brightness variation cycle, and eliminate interferences of ambient light according to the brightness variation cycle and distinguish the different reference points according to the different brightness values associated with each of the reference points in a single sampling of the light of the predetermined spectrum;
    wherein the different brightness values are not zero gray level.

2. The control device as claimed in claim 1, wherein the different brightness values have a multiple relationship.

3. The control device as claimed in claim 1, wherein the brightness variation cycle is an integer multiple of the sampling cycle.

4. The control device as claimed in claim 1, further comprising two diffusers positioned in front of the reference points, respectively.

5. The control device as claimed in claim 1, wherein the remote controller further comprises:
    an image sensor configured to capture the light of the predetermined spectrum with the sampling cycle and generate a digital signal; and
    a processing unit configured to receive and demodulate the digital signal to form a digital image and then obtain an image variation of the reference points with respect to the remote controller according to the digital image.

6. The control device as claimed in claim 5, wherein the remote controller further comprises:
    an optical filter positioned in front of the image sensor to remove the light out of the predetermined spectrum; and
    a wireless communication unit configured to communicate with the image sensor.

7. The control device as claimed in claim 1, wherein the reference points have different areas.

8. A control device of an image display, comprising:
    a first reference point and a second reference point configured to generate light of a predetermined spectrum;
    a modulation unit configured to modulate the light generated by the first reference point with a first cycle and the light generated by the second reference point with a second cycle, wherein the modulation unit is configured to control the first reference point to emit the light with a first brightness within a first period of the first cycle and to emit the light with a second brightness within a second period of the first cycle, and the modulation unit is configured to control the second reference point to emit the light with a third brightness within a third period of the second cycle and to emit the light with a fourth brightness within a fourth period of the second cycle; and
    a remote controller configured to capture the light of the predetermined spectrum with a sampling cycle which is shorter than the first period, the second period, the third period and the fourth period, and eliminate interferences of ambient light according to the first cycle and the second cycle and distinguish different reference points according to the first brightness, the second brightness, the third brightness and the fourth brightness respectively associated with the first and second reference points in a single sampling of the light of the predetermined spectrum;
    wherein the first brightness, the second brightness, the third brightness and the fourth brightness are different from one another and not zero gray level.

9. The control device as claimed in claim 8, wherein the second brightness is half or twice the first brightness, and the fourth brightness is half or twice the third brightness.

10. The control device as claimed in claim 8, wherein the first cycle, the second cycle and the sapling cycle are an integer multiple of each other.

11. The control device as claimed in claim 8, further comprising two diffusers positioned in front of the first and second reference points, respectively.

12. The control device as claimed in claim 8, wherein the remote controller further comprises:
    an image sensor configured to capture the light of the predetermined spectrum with the sampling cycle and generate a digital signal; and
    a processing unit configured to receive and demodulate the digital signal to form a digital image and then obtain an image variation of the first and second reference points with respect to the remote controller according to the digital image.

13. The control device as claimed in claim 12, wherein the remote controller further comprises:
    an optical filter positioned in front of the image sensor to remove the light out of the predetermined spectrum; and
    a wireless communication unit configured to communicate with the image sensor.

14. The control device as claimed in claim 8, wherein the first cycle is equal to the second cycle.

15. The control device as claimed in claim 8, wherein the first and second reference points have identical or different areas.

16. A control method for an image display, comprising:
    providing a first reference point and a second reference point to generate light of a predetermined spectrum;
    modulating the light generated by the first reference point with a first cycle so that the first reference point emits the light with a first brightness within a first period of the first cycle and emits the light with a second brightness within a second period of the first cycle;
    modulating the light generated by the second reference point with a second cycle so that the second reference point emits the light with a third brightness within a third period of the second cycle and emits the light with a fourth brightness within a fourth period of the second cycle; and
    providing a remote controller to capture the light of the predetermined spectrum with a sampling cycle which is shorter than the first period, the second period, the third period and the fourth period, and eliminate interferences of ambient light according to the first cycle and the second cycle and distinguish different reference points according to the first brightness, the second brightness, the third brightness and the fourth brightness respectively associated with the first and second reference points in a single sampling of the light of the predetermined spectrum;
    wherein the first brightness, the second brightness, the third brightness and the fourth brightness are different and not zero gray level.

17. The control method as claimed in claim 16, further comprising:
    demodulating an image variation of the first and second reference points with respect to the remote controller;
    transmitting the image variation to an image display; and
    controlling the image display to perform a corresponding action according to the image variation.

18. The control method as claimed in claim 16, wherein the second brightness is half or twice the first brightness, and the fourth brightness is half or twice the third brightness.

19. The control method as claimed in claim 16, wherein the first cycle, the second cycle and the sampling cycle are an integer multiple of each other.

20. The control method as claimed in claim 16, wherein the first cycle is equal to the second cycle.

* * * * *